United States Patent
Haruta et al.

(10) Patent No.: US 12,221,251 B2
(45) Date of Patent: Feb. 11, 2025

(54) HEAT-SHRINKABLE POLYESTER FILM HAVING LONGITUDINAL (LENGTHWISE) DIRECTION AS MAIN SHRINKAGE DIRECTION

(71) Applicant: TOYOBO CO., LTD., Osaka (JP)

(72) Inventors: Masayuki Haruta, Tsuruga (JP); Norimi Tabota, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 442 days.

(21) Appl. No.: 17/615,883

(22) PCT Filed: Jun. 1, 2020

(86) PCT No.: PCT/JP2020/021580
§ 371 (c)(1),
(2) Date: Dec. 2, 2021

(87) PCT Pub. No.: WO2020/246420
PCT Pub. Date: Dec. 10, 2020

(65) Prior Publication Data
US 2022/0306345 A1    Sep. 29, 2022

(30) Foreign Application Priority Data

Jun. 5, 2019 (JP) ................. 2019-105417

(51) Int. Cl.
| | | |
|---|---|---|
| B65D 25/20 | (2006.01) | |
| B65C 3/16 | (2006.01) | |
| C08G 63/183 | (2006.01) | |
| G09F 3/00 | (2006.01) | |
| G09F 3/02 | (2006.01) | |

(52) U.S. Cl.
CPC .............. *B65D 25/20* (2013.01); *B65C 3/166* (2013.01); *C08G 63/183* (2013.01); *G09F 3/0291* (2013.01); *G09F 2003/0272* (2013.01)

(58) Field of Classification Search
CPC ........ B65D 25/20; B65D 25/36; B65D 65/38; B65D 65/02; B65C 3/166; C08G 63/183; C08G 63/181; G09F 3/0291; G09F 2003/0272; G09F 3/04; B29C 61/06; B29C 55/06; B29C 55/20; B29C 61/02; B29K 2067/00; B29L 2007/002; B29L 2007/00; B65B 53/04; B65B 53/06; C08J 5/18; B29D 7/01
See application file for complete search history.

(56) References Cited

U.S. PATENT DOCUMENTS

| | | |
|---|---|---|
| 2010/0173229 A1 | 7/2010 | Hikida et al. |
| 2015/0014202 A1 | 1/2015 | Haruta et al. |
| 2016/0347920 A1 | 12/2016 | Inoue et al. |
| 2018/0162616 A1 | 6/2018 | Inoue et al. |
| 2018/0208375 A1 | 7/2018 | Haruta et al. |

FOREIGN PATENT DOCUMENTS

| | | |
|---|---|---|
| CN | 107708966 A | 2/2018 |
| JP | 2014-024253 A | 2/2014 |
| JP | 2015-199337 A | 11/2015 |
| JP | 2016-193491 A | 11/2016 |
| JP | 6572907 B2 | 9/2019 |
| WO | WO 2018/003994 A1 | 1/2018 |

OTHER PUBLICATIONS

Japanese Patent Office, International Search Report in International Patent Application No. PCT/JP2020/021580 (Aug. 11, 2020).
Intellectual Property India, Examination Report in Indian Patent Application No. 202147059891 (Jan. 11, 2024).
China National Intellectual Property Administration, Office Action in Chinese Patent Application No. 202080040954.9 (Sep. 19, 2022).
European Patent Office, Extended European Search Report in European Patent Application No. 20818968.8 (Aug. 23, 2023).

*Primary Examiner* — Andrew D Perreault
(74) *Attorney, Agent, or Firm* — Leydig, Voit & Mayer, Ltd.

(57) ABSTRACT

[Problem] To provide a heat-shrinkable polyester film having excellent shrink finishing property due to the film's sufficient heat shrinkability and low shrinkage stress in the longitudinal direction, small change in the non-shrinkable direction of the film.

[Solution] The heat-shrinkable polyester film which heat-shrinks in the longitudinal direction and satisfying the following (1) to (6); (1) having a shrinkage of 35% to 70% in the longitudinal direction; (2) having a shrinkage of −8% to 7% in the width direction; (3) having a change rate of 5% to 22% when fixed in the longitudinal direction with fixed-length; (4) having a change rate of 5% to 20% in the width direction when fixed with 10% of slack in the longitudinal direction; (5) having a maximum shrinkage stress of 5 MPa to 15 MPa in the longitudinal direction; (6) having a stress at 10% elongation, F10, of 1 MPa to 5 MPa in the longitudinal direction and 0.5 MPa to 3 MPa in the width direction.

6 Claims, No Drawings

HEAT-SHRINKABLE POLYESTER FILM HAVING LONGITUDINAL (LENGTHWISE) DIRECTION AS MAIN SHRINKAGE DIRECTION

TECHNICAL FIELD

The present invention relates to a polyester film having a heat-shrinkability in the longitudinal direction which is a mechanical direction (MD), of the film and an excellent appearance after shrinkage, and also relates to a container covered with a band label made from the film. More particularly, the present invention relates to a heat-shrinkable polyester film suitably used as a band label for a box lunch container and a noodle container used at a supermarket or a convenience store. The heat-shrinkable polyester film of the present invention shrinks in the longitudinal direction of a film roll, has a change rate in the width direction after shrinkage in the longitudinal direction within a determined range and a shrinkage stress at the time of heating within a determined range, and thereby good shrink-finishing can be achieved.

BACKGROUND ART

In recent years, a drawn film, so called heat-shrinkable film, composed of a polyvinyl chloride resin, a polystyrene resin, a polyester resin or the like has been widely used for both the label packaging of a glass bottle and a PET bottle to protect the bottles themselves and to display product information, and also the film has been used for a banding packaging and a label packaging to fasten a lunch box, which is sold at a convenience store and composed of a container and its lid. Among the above-mentioned heat-shrinkable films, a polyvinyl chloride film has a low heat resistance in addition to causing hydrogen chloride gas generation and dioxin at the time of incineration. Also, a polystyrene film has a poor solvent resistance, so an ink with a special composition is required when printing on the film. In addition, the polystyrene film requires to be incinerated at a high temperature, and a large amount of black smoke accompanying odor is generated at the time of incineration. Therefore, a heat-shrinkable film with a high heat resistance, easily incinerated, and having excellent solvent resistance has been widely used as a shrinkable label. The usage of the polyester film has been on the increase.

As a commonly used heat-shrinkable polyester film, a film shrank largely in the width direction has been widely used. When the film is used as the label film for a bottle and as the band label for a box lunch container, the film is first made into an annular form and the annular-formed film is placed so that it wraps around a bottle or a box lunch container. Then the film is heat-shrunk in the circumferential direction. When a heat-shrinkable film which shrinks in the width direction is used, the film is first made into an annular form in which the width direction of the film is the circumferential direction, and then the annularly formed film is cut by every predetermined length. The cut pieces of film are placed to wrap around the bottles and the boxes lunch container by hand. When the label film and the band label made from the heat-shrinkable film which shrinks in the width direction are used, the labels can't be wrapped around a bottle or a box lunch container at a high a speed. Preferably, the film which can be unwind from a film roll and directly wrap around a bottle or a box lunch container as well as having the ability to heat-shrink in the longitudinal direction has been recently on demand. With this kind of film, a bottle or a box lunch container can be wrapped around without the processes such as center sealing to form annular-shaped film by sealing, cutting of film, and covering by hand. In addition, a bottle or a box lunch container can be wrapped around at a high speed.

Recently, the number and the kind of cooked lunch boxes, noodle products such as udon or ramen has been increasing at convenience stores and the like. The labeling way of the containers including the food inside has been changing to the way of wrapping the container with a side-shrink label. The side-shrink label fasten a container and its lid by wrapping them and heat-shrunk by the side of them. By the labeling method above mentioned, the inside of the container, cooked food or noodle, can be clearly seen from above of the container, and this is more preferable way compared to wrapping the whole container. In the case of so-called band label packaging, cooked noodle is placed in a deep plastic container, and the container is covered with its lid from above, and then the container and its lid are closed from above and below with an annular-shaped shrink film. In the band label packaging, an automatic packaging way by which a container is wrapped around directly from a film roll is required. In the automatic way of wrapping, the shrinkable film unwind from two film rolls is heat-sealed in the width direction at first, an unwrapped container such as a noodle container is placed between the film having a heat-sealed part at one end, then the film is formed into an annular shape by heat-sealing the opposite part of the film having one side opening. Finally, the annular-shaped film becomes a band label by heating the annular-shaped film with hot air to be shrunk, and the label fasten the container and its lid.

As it has already been mentioned, the shrinkable film used as a side-shrink label and a band label can fasten the container and its lid. In addition, the film can enhance the commercial value of products by reducing distortion in the non-shrinkable direction during shrinkage and giving excellent appearance to products. Also, the container should not to be deformed due to the stress of shrinkage. A deformed container is not preferable in appearance as a commercial product, and the deformed shape may lead to the spilling off of its contents or contamination of foreign matter. Further, if the shrinkage stress of the film is high, a force called neck-in force acts in the direction orthogonal to the shrinkage direction after film shrinkage, and the force may cause large distortion in the width direction and give undesirable appearance to a container. If the shrinkage stress is low, the closure between the container and its lid becomes loose, so the gap between the lid and the container may be generated by vibration during transportation, and the gap may undesirably lead to the contamination of foreign matter.

For example, according to the Patent Document 1, in the heat-shrinkable film specially used for a coating of a battery cell or the like, the heat cycle evaluation test becomes satisfactory by preventing the deformation caused by neck-in force in the non-shrinkable direction after shrinkage. However, the heat-shrinkable film described in Patent Document 1 has the width direction as the main shrinkage direction, and the heat-shrinkable film having the longitudinal direction as the main shrinkage direction is not described in the document. In addition, heat shrinkage in the longitudinal direction of the film at 80° C. is low. Therefore, the temperature at which the film is heat shrunk required to be higher if the film is used and shrunk to fasten a box lunch container or a daily dish container. When the film is heat shrunk at a high temperature, the high temperature undesirably may affect the container and its contents. In addition, the film has low shrinkage stress, and the closure between the container and its lid may become loose. When the film is used for side a shrink label or a band label, a gap between the container and its lid may occur because of the loose closure during transportation. The gap may undesirably lead to foreign matter contamination.

PRIOR ART DOCUMENT

Patent Documents

Patent Document 1: International publication WO 2018/003994

SUMMARY OF THE INVENTION

Problems to be Solved by the Invention

The present invention aims to provide a heat-shrinkable polyester film having an excellent appearance after shrinkage. The film is suitably used for a side-shrink label and a band label, and has sufficient heat shrinkage characteristic in the longitudinal direction. The film also has the change rate in the width direction within a determined range and the shrinkage stress in the longitudinal direction within a determined range.

Means for Solving the Problems

The present invention that has solved the above-described problem is as follows.
[1] A heat-shrinkable polyester film having a main shrinkage direction in a longitudinal direction of the film, wherein the film satisfies the following requirements (1) to (6):
(1) the film has a shrinkage of 35% or more and 70% or less in the longitudinal direction after 10 seconds immersion in hot water of 80° C.
(2) the film has a shrinkage of −8% or more and 7% or less in a width direction orthogonal to the longitudinal direction after 10 seconds immersion in hot water of 80° C.
(3) the film has a change rate of 5% or more and 22% or less in the width direction of the film, and the change rate is measured by fixing the film in the longitudinal direction with fixed-length in the longitudinal direction and gripping the film in hot air of 90° C. for 10 seconds.
(4) the film has a change rate of 5% or more and 20% or less in the width direction of the film, and the change rate is measured by fixing the film in the longitudinal direction with 10% of slack in the longitudinal direction and gripping the film in hot air of 90° C. for 10 seconds.
(5) the film has a maximum shrinkage stress of 2 MPa or more and 10 MPa or less in the longitudinal direction measured under hot air of 90° C.
(6) the film has a stress at 10% elongation of 1 MPa or more and 5 MPa or less in the longitudinal direction and 0.5 MPa or more and 3 MPa or less in the width direction when measured under hot air of 90° C.
[2] The heat-shrinkable polyester film according to [1], wherein the film has a thickness of 6 μm or more and 30 μm or less.
[3] The heat-shrinkable polyester film according to [1] or [2], wherein the film has butanediol constituent of 8 mol % or more and 40 mol % or less in a whole glycol constituent of the polyester constituting the film.
[4] The heat-shrinkable polyester film according to any one of [1] to [3], wherein the film has a maximum heat shrinkage stress of 1 MPa or more and 6 MPa or less, and the maximum shrinkage stress is measured by fixing the film with 10% of slack in the longitudinal direction under hot air of 90° C.
[5] The heat-shrinkable polyester film according to any one of [1] to [4], wherein the film is used as a band label for a plastic container for packaging.
[6] A container covered with a band label, wherein the band label is formed by heat-sealing the heat-shrinkable polyester film according to any one of [1] to [5] in an annular shape.

Effects of the Invention

The present inventors have found that a film having sufficient shrinkage in the longitudinal direction is obtained by uniaxial drawing an undrawn sheet made from a polyester resin having a specific composition in the longitudinal direction and applying relaxation treatment to thus-obtained film in the longitudinal direction. The inventors also found that a label made from the film has excellent appearance after shrinkage due to the film's properties as follows; having change rate in the width direction within a determined range, having shrinkage stress in the longitudinal direction within a determined range, and preventing a wrapped container being deformed at the time of shrinkage.

The heat-shrinkable polyester film of the present invention has sufficient heat shrinkage characteristics in the longitudinal direction of film, and is suitably used as a side-shrink label and a band label for a box lunch container and the like. The film can wrap around a container very efficiently in a short time because the main shrinkage direction of the film is the longitudinal direction of the film. In addition, the film is heat-shrunk to be fitted without shortage of shrinkage, and also without deformation of a container and a label's slack due to the shrinkage stress within a determined range. And a good finished appearance is obtained due to the low change rate in the width direction.

MODE FOR CARRYING OUT THE INVENTION

Hereinafter, the composition of the heat-shrinkable polyester film of the present invention will be described.
[Characteristics of Heat-Shrinkable Polyester Film Having Longitudinal (MD) Direction as Main Shrinkage Direction]

The heat-shrinkable polyester film of the present invention has the heat shrinkage of 35% or more and 70% or less in the longitudinal direction of the film when the film is treated with no load and in hot water of 80° C. for 10 seconds. The heat shrinkage is calculated from the length of the film before and after shrinkage according to the following formula 1. The heat shrinkage measured in the state may be referred to as hot-water heat shrinkage at 80° C.

heat shrinkage=((length before shrinkage−length after shrinkage)/length before shrinkage)×100 (%)   Formula 1:

The film having the hot-water heat shrinkage in the longitudinal direction at 80° C. of less than 35% is not preferably used as a side-shrink label and a band label because the small amount of shrinkage of the film cause wrinkles and a slack of film after heat shrinkage. If the film requires higher temperatures to obtain high shrinkage, the higher temperature causes deformation of a container to occur and secondarily damages the contents by warming them up. Therefore, the film preferably has high hot-water heat shrinkage in the longitudinal direction at 80° C. The hot-water heat shrinkage in the longitudinal direction of the film is preferably 38% or more, and more preferably 41% or more.

When the hot-water heat shrinkage in the longitudinal direction is larger than 70%, the shrinkage stress also increases as well, and thereby causing the wrapped container to be deformed. The hot-water heat shrinkage in the longitudinal direction is more preferably 67% or less, and further preferably 64% or less.

A heat-shrinkable polyester film of the present invention has the heat shrinkage of −8% or more and 7% or less in the width direction of the film when the film is treated with no load and in hot water of 80° C. for 10 seconds. The shrinkage is calculated from the film's length change before and after shrinkage according to the above formula 1. The heat shrinkage may be referred to as a hot-water heat shrinkage at 80° C. Though the hot-water heat shrinkage at 80° C. may be less than −8%, the lower limit measured was −8% in the present invention, and the value was taken as a lower limit. If the value is greater than 7%, the change rate in the non-shrinkable direction after shrinkage becomes high, and the labels after shrinkage have undesirably impaired appearance which is not allowable to be used as a side-shrink label or a band label. The hot-water heat shrinkage in the width direction of the film at 80° C. is preferably 6% or less, and more preferably 4% or less.

A heat-shrinkable polyester film of the present invention has the change rate of 5% or more and 22% or less in the width direction when the film is fixed in the longitudinal direction in hot air of 90° C. and treated for 10 seconds. The change rate was calculated according to the following formula 2.

change rate of film in width direction=((width before shrinkage−width after shrinkage)/width before shrinkage)×100(%)    Formula 2:

If the shrinkage rate obtained from the above formula 2 is higher than 22%, the film is not preferably used as a side-shrink label or a band label, for the change rate in the non-shrinkable direction after shrinkage becomes large and the labels after shrinkage lacks in appearance. The change rate in the width direction is preferably 20% or less, and more preferably 18% or less. Though the lower limit of the change rate is preferably 0%, the rate was not achieved in the present invention, and the lower limit was determined as 5%.

A heat-shrinkable polyester film of the present invention has the change rate of 5% or more and 20% or less in the width direction when the film is fixed with 10% slack in the longitudinal direction and treated for 10 seconds in hot air of 90° C. That is, the change rate when the film is shrunk by 10% in the longitudinal direction.

If the change rate obtained from the above formula 2 is higher than 20%, this means change rate in the non-shrinkage direction after shrinkage becomes too high as a side-shrink label or a band label, and the labels after shrinkage lack in appearance. The change rate in the width direction is preferably 20% or less, more preferably 18% or less. The lower limit of the change rate is preferably 0%, the rate was not achieved in the present invention, and the lower limit was determined as 5%.

A heat-shrinkable polyester film of the present invention has the 10% elongation stress, so called F10, of preferably 1 MPa or more and 5 MPa or less in the longitudinal direction when measured in hot air of 90° C. When F10 in the longitudinal direction is higher than 5 MPa, the elastic modulus in the longitudinal direction becomes high at the time of shrinkage. Undesirable phenomenon that the film drags in the width direction occurs due to necking, and the deformation in the width direction at the time of shrinkage becomes large. F10 in the longitudinal direction is more preferably less than 4.5 MPa, and further preferably 4 MPa or less. The smaller F10 in the longitudinal direction at 90° C. is, the more preferable the F10 is. However, the lower limit of F10 of the present invention is 1 MPa because the film having F10 smaller than 1 MPa has insufficient heat shrinkage and becomes inappropriate as heat-shrinkable film.

So called F10, elongation at 10% stress measured in hot air of 90° C. in the width direction is preferably 0.5 MPa or more and 3 MPa or less. When F10 in the width direction is smaller than 0.5 MPa, the elastic modulus at the time of shrinkage becomes too low. Undesirable phenomenon that the film drags in the width direction occurs due to necking, and the deformation in the width direction at the time of shrinkage becomes large. F10 in the width direction is more preferably 1 MPa or more, and further preferably 1.5 MPa or more. It is preferable for F10 in the width direction at 90° C. to be equivalent to F10 in the longitudinal direction, however, F10 in the width direction couldn't be higher than 3 MPa in the present invention, and therefore the upper limit of F10 is 3 MPa.

A heat-shrinkable polyester film of the present invention preferably has the maximum value of the shrinkage stress of 2 MPa or more and 10 MPa or less in the longitudinal direction when measured in hot air of 90° C. The film has the shrinkage stress of smaller than 2 MPa in hot air of 90° C., in this case, the film doesn't shrink tightly enough as a band label. Therefore, the film doesn't meet its original intention. The shrinkage stress in the longitudinal direction of the film measured in hot air of 90° C. is preferably 2.2 MPa or more, and more preferably 2.4 MPa or more. The film having shrinkage stress of higher than 10 MPa bring deformation of a container with an unpreferable appearance, causing the spilling off of its contents or foreign matter contamination. The shrinkage stress in the longitudinal direction of the film measured in hot air of 90° C. is preferably 9.8 MPa or less, and more preferably 9.6 MPa or less.

The heat-shrinkable polyester film of the present invention preferably has the maximum value of shrinkage stress of 1 MPa or more and 6 MPa or less in the longitudinal direction measured when the film is set with 10% slack in the longitudinal direction and under hot air of 90° C. That is, the maximum value measured when the film is 10% heat shrunk in the longitudinal direction. The film has the shrinkage stress of smaller than 1 MPa when the film has 10% slack and under hot air of 90° C. In this case, the film doesn't shrink tightly enough as a band label, therefore, the film doesn't meet its original intention. Further, the product with a noodle inside may be reheated in a microwave oven, at that time, the reheated band label may shrink again and shrinkage stress is generated. The shrinkage stress in the longitudinal direction of the film measured in a state of being loosened by 10% in the longitudinal direction under hot air at 90° C. is more preferably 5.8 MPa or less, and further preferably 5.6 MPa or less.

Thickness of the heat-shrinkable polyester film of the present invention is preferably 6 to 30 μm as a heat-shrinkable polyester film used for labeling or banding including a band label. The thickness is more preferably 8 to 28 μm, and particularly preferably 10 to 26 μm. An excessive thickness of the film increases the absolute value of the shrinkage, and the film used for banding may deform a container.

[Polyester Used for Heat-Shrinkable Polyester Film of the Present Invention]

The heat-shrinkable polyester film of the present invention preferably has terephthalic acid as a main constituent of dicarboxylic acid constituent. Having terephthalic acid as a main constituent means that 50 mol % or more of 100 mol % of dicarboxylic acid constituting the polyester is terephthalic acid. Preferably, terephthalic acid is contained 60 mol % or more, and further preferably 70 mol % or more.

Examples of dicarboxylic acid other than terephthalic acid and contained in the polyester constituting the heat-shrinkable polyester film of the present invention include aromatic dicarboxylic acids such as isophthalic acid, naphthalenedicarboxylic acid, and orthophthalic acid, aliphatic dicarboxylic acids such as adipic acid, azelaic acid, sebacic acid and decancarboxilic acid, and alicyclic dicarboxylic acid.

When the aliphatic dicarboxylic acids such as adipic acid, sebacic acid, and decandicarboxylic acid are contained in polyester, the content rate is preferably less than 3 mol % in 100 mol % of dicarboxylic acid constituents.

Preferably, the polycarboxylic acids having a valence of 3 or greater such as trimellitic acid, pyromellitic acid and anhydride thereof are not contained in the polyester. A high shrinkability required become hard to be achieved in the heat-shrinkable polyester film made from the polyester containing those polycarboxylic acids.

Examples of the polyhydric alcohol constituents of polyester used for heat-shrinkable polyester film of the present invention are alicyclic diols such as ethylene glycol, 1,3-propanediol, 1,4-butanediol, neopentyl glycol and hexanediol, alicyclic diols such as 1,4-cyclohexanedimethanol, and aromatic diols such as bisphenol A. Ethylene glycol is preferably contained as a polyhydric alcohol having the largest amount of all the polyhydric alcohol mentioned above. Preferable amount of ethylene glycol contained is 40 mol % or more, and more preferably 45 mol % or more in 100 mol % of polyhydric alcohol constituents.

Polyester used for the heat-shrinkable polyester film of the present invention is preferably containing 1,4-butanediol. By containing 1,4-butanediol, a glass-transition temperature, Tg, of the film becomes lowered. With the lowered glass-transition temperature, the drawing stress during drawing of the film can be reduced, and the shrinkage stress of the film is reduced as a result. Also, the lowered glass-transition temperature leads to the effect of increased peel strength after heat sealing. Because of the lowered glass transition temperature, the motility of molecular chains become high, and this is thought to effect more molecular chains to be entangled with each other by the heat and the pressure at the time of heat-sealing. Preferably, the amount of 1,4-butanediol contained is 8 mol % or more and 40 mol % or less in 100 mol % of polyhydric alcohol constituents. When the amount of 1,4-butanediol is less than 8 mol %, the film having low shrinkage stress and high heat-sealability is not obtained, which is not preferable. Also, when the amount is higher than 40 mol %, drawing stress becomes too low and the thickness precision of the film becomes undesirably poor. The amount of 1,4-butanediol contained is preferably 10 mol % or more and 38 mol % or less, more preferably 12 mol % or more and 36 mol % or less, and particularly preferably 14 mol % or more and 34 mol % or less.

As described above, the film has increased heat sealing strength and decreased shrinkage stress by containing 8 mol % or more and 40 mol % or less of 1,4-butanediol. This means that heat-sealed part of film is less likely to be ripped by shrinkage when the film used as a label is shrunk.

Further, to give a high shrinkage property to film, the polyester constituting the film preferably includes 10 mol % or more of monomers which may be an amorphous component. This means that the total amount of the one or more monomers which may be an amorphous component in 100 mol % of polyhydric alcohol or 100 mol % of polycarboxylic acid in all polyester resin. If the amount of the polyester is less than 10 mol %, shrinkage required is not achieved, therefore, shrinkage becomes insufficient at the time of shrinkage finishing. The amount of the monomers possibly becomes an amorphous component is 10 mol % or more, preferably 11 mol % or more, more preferably 12 mol % or more, and particularly preferably 13 mol % or more. Though the maximum amount of monomers which may become an amorphous component is not particularly limited, the maximum amount is preferably 40 mol %.

Here, detailed explanation and interpretation of the words "which may be an amorphous component" are given.

In the present invention, "an amorphous polymer" means the case in which polymer has no endothermic peak by fusion when measured by DSC, a differential scanning calorimetry. In the amorphous polymer, crystallization is not substantially proceeding. Therefore, the polymer may not be in a crystalline state, or the degree of crystallization is extremely low even if the polymer is getting crystallized.

Generally, the polymer in which a large number of monomer units are bonded may be an amorphous polymer especially when the polymer has specific conditions such as low stereoregularity of a polymer, poor symmetry of a polymer, large side chains of a polymer, much-branched polymer, and small cohesive force between the molecules. However, a polymer may be a crystalline polymer with the crystallization proceeding dependent on the polymer's state of existence. For example, a polymer having a large side chain may become crystalline with its sufficiently proceeded crystallization when the polymer is composed of a single monomer unit. Therefore, the expression "which may be an amorphous component" is used in this invention considering of both possibilities, the same monomer units may take either state, crystalline or amorphous.

In this invention, a monomer unit represents a repeating unit derived from one polyhydric alcohol molecule and one polyvalent carboxylic acid molecule. In the case of ε-caprolactone, the monomer unit is the constituting unit obtained by opening a lactone ring.

When the monomer unit derived from terephthalic acid and ethylene glycol is the main constituent monomer units of polymer, examples of the units which may become above-described amorphous component are as follows, the monomer unit constituting of isophthalic acid and ethylene glycol, the monomer unit constituting of terephthalic acid and neopentyl glycol, the monomer unit constituting of terephthalic acid and 1,4-cyclohexanedimethanol, and the monomer unit constituting of isophthalic acid and butanediol.

Examples of the monomers which may be an amorphous component are 1,4-cyclohexanedimethanol, isophthalic acid, 1,4-cyclohexanedicarboxylic acid, 2,6-naphthalenedicarboxylic acid, 2,2-diethyl-1,3-propanediol, 2-n-butyl-2-ethyl-1,3-propanediol, 2,2-isopropyl-1,3-propanediol, 2,2-di-n-butyl-1,3-propanediol, and hexanediol. Among the monomers above-mentioned, 1,4-cyclohexanedimethanol or isophthalic acid is preferably used, and ε-caprolactone may also be preferably used. More preferably neopentyl glycol or 1,4-cyclohexanedimethanol, and further preferably neopentyl glycol is used.

To the resin forming a heat-shrinkable polyester film of the present invention, the additives such as waxes, an antioxidant, an antistatic agent, a crystal-nucleation agent, a viscosity reducing agent, a heat stabilizer, a pigment for coloring, a color protection agent, and an ultraviolet absorber may be added as needed.

Fine particles such as lubricants are added to the resin forming a heat-shrinkable polyester film of the present invention to improve film workability such as slipperiness, and any fine particles are selected. As examples of the particles, silica, alumina, titanium dioxide, calcium carbonate, kaolin, and barium sulfate as inorganic fine particles, and acrylic resin particles, melamine resin particles, silicone resin particles, crosslinked polystyrene particles as organic fine particles are included. The average particle diameter of the fine particles is within the range of 0.05 to 3.0 μm when the particles are measured by a Coulter counter, particles having a desirable diameter can be selected as needed.

The method by which the above-described particles are added to the resin forming a heat-shrinkable polyester film of the present invention is, for example, adding the particles at any stages of reaction in the production of the polyester resin. The particles are preferably added to promote a polycondensation reaction. And the particles are added at the stage of esterification or added as a slurry dispersed in ethylene glycol at the stage after the completion of the transesterification reaction and before the start of the polycondensation reaction. Further, the above-described particles are added preferably by the method of blending a slurry of particles dispersed in ethylene glycol or water and polyester resin raw material using a kneading extruder having a vent, or a method of blending dried particles and polyester resin raw material using a kneading extruder.

[Production Method for Heat-Shrinkable Polyester Film of the Present Invention: Heat-Shrinkable Polyester Film Having Excellent Appearance after Shrinkage and Heat-Shrinkable in Longitudinal Direction]

The heat-shrinkable polyester film of the present invention is not particularly restricted in the production method. The polyester film is obtained, for example, by the melt extrusion of the polyester raw material above-mentioned using an extruder to form an undrawn film. The undrawn film thereof is produced by the method shown below.

Polyester raw material is preferably dried using a dryer such as a hopper dryer, a paddle dryer, or a vacuum dryer when resin material is melt-extruded. After dried in such a way, the polyester raw material is molten at 200 to 300° C. and extruded into film using an extruder. Any existing method such as a T-die method or a tubular method can be adopted for extrusion.

An undrawn film is then obtained by quenching the sheet-shaped molten resin after extrusion. As a method to quench molten resin, the method in which molten resin is cast from a mouthpiece onto a rotating drum for quenching solidification to obtain an undrawn substantially unoriented resin sheet is preferably adopted.

Furthermore, the heat-shrinkable polyester film of the present invention is acquired by drawing the obtained undrawn film in the longitudinal direction under certain conditions as described below.

A typical heat-shrinkable polyester film is produced by drawing an undrawn film in the direction for the film expected to have shrinkability. In the present invention, the undrawn film is preferably uniaxial drawn in the longitudinal direction, the main shrinkage direction. When the film is uniaxial drawn in the longitudinal direction, the undrawn film is introduced to a lengthwise drawing machine in which a plurality of rolls was continuously arranged, and heated until the film reached a determined temperature on a preheating roll. Then a roll rotating higher speed (herein after may be referred to as a "high speed roll") than the preheating roll (herein after may be referred to as a "low speed roll") is arranged to downstream of the preheating roll. And the film is drawn in the longitudinal direction using the speed gap between the low speed roll and the high speed roll. The production method of the film by uniaxial drawing in the longitudinal direction is preferable in that the method has an advantage capable of using simple equipment and a lateral drawing machine is unnecessary.

The method of the longitudinal drawing is not particularly restricted, the multistage drawing such as biaxial drawing is preferable. Due to the multistage drawing of film, the stress which acts at the time of shrinkage is dispersed, and in accordance with that, the residual stress becomes reduced.

The drawing ratio is not particularly restricted, preferably the ratio is 2 times or more and 6 times or less. When the ratio is less than 2 times, the film having high shrinkage in its mass balance becomes hard to be obtained and the film's thickness precision becomes worse. Also, with the drawing ratio exceeding 6 times, the peer strength after heat sealing is decreased because the surface orientation of the film is promoted, and shrinkage stress becomes undesirably high. Further, biaxial drawing is not preferable for the film of the present invention. For example, as a method being assumed, drawing an undrawn film first in the width direction using a tenter and then drawing the film in the longitudinal as a main shrinkage direction can be mentioned. However, if this method is employed, shrinkage stress in the longitudinal direction at the time of shrinkage becomes high and this results in the higher shrinkage stress.

The methods to heat the film before and while being drawn are not particularly restricted. Film may be heated using an infrared heater or a condensing infrared heater between low speed rolls and high speed rolls in addition to the ways of heating film on the above-described roll.

When the temperature at which film is drawn in the longitudinal direction is lower than Tg+5° C., rupture of film is undesirably occurs at the time of drawing. When the temperature is higher than Tg+40° C., unfavorably, thermal crystallization of film is promoted and the shrinkage is decreased. The temperature is more preferably Tg+8° C. or higher and Tg+37° C. or lower, and further preferably Tg+11° C. or more and Tg+34° C. or lower.

After the drawing in the longitudinal direction above-described, the film is preferably relaxed or heat treated in the longitudinal direction. This process is necessary to adjust film not to have high shrinkage in the longitudinal direction and to lower the shrinkage stress. The method to apply relaxation treatment to film in the longitudinal direction is not particularly restricted. For example, film is heated by heating a roll after drawn in the longitudinal direction. As another method, film is heat treated by placing the film in a tenter in which both edges of the film is grasped with clips and the film is heated.

In the present invention, after drawn in the longitudinal direction, the film is heat treated at a higher temperature than preheating roll, and preferably the film is relaxed in the longitudinal direction using the speed gap between the rolls. The film is preferably relaxed at the place where the distance between the rolls used for the relaxation treatment is 500 mm or longer and 1500 mm or shorter between them. The film is heated to be relaxed by applying hot air heated to 90 to 120° C. The film after relaxation treatment is cooled with a cooling roll set to a surface temperature of 30° C.

When the distance between the rolls is shorter than 500 mm at the time of relaxing, the deformation speed during relaxation becomes high, and undesirably, the insufficient relaxation causes wrinkles on film. The distance is preferably 550 mm or longer, further preferably 600 mm or longer. When the distance is longer than 1500 mm, shrinkage of film in the width direction, so called neck-in becomes large, and a difference in physical properties of film in the width direction and thickness precision becomes undesirably worse. The distance is preferably 1450 mm or shorter, and more preferably 1400 mm or shorter.

The relaxation ratio in the longitudinal direction is not particularly limited, preferably the ratio is 2% or more and 20% or less. If the ratio is smaller than 2%, relaxation in the longitudinal direction becomes insufficient, and shrinkage stress undesirably becomes high. The ratio is preferably 4% or more, and more preferably 6% or more. If the ratio is higher than 20%, relaxation in the longitudinal direction becomes large, and the shrinkage in the longitudinal direction becomes insufficient. The ratio is preferably 18% or less, and more preferably 16% or less.

EXAMPLES

The present invention is hereinafter described in more detail with reference to Examples, but the present invention is not restricted by the following Examples, carried out with appropriate modifications made to the extent adaptable to the gist of the present invention.

Evaluation methods for films are as follows.

[Tg (Glass Transition Point)]

Tg (° C.) was measured in accordance with JIS-K 7121-1987 using a differential scanning calorimeter (DSC220, Seiko Instruments). After placing 5 mg of an undrawn film in a sample pan, the sample pan was closed with a lid. The measurement was carried out with the temperature raised from −40° C. to 120° C. at a temperature rising rate of 10° C./min in a nitrogen gas atmosphere.

[Intrinsic Viscosity (IV)]

After a test sample was prepared by dissolving 0.2 g of polyester in 50 ml of a mixed solvent of phenol/1,1,2,2-tetrachloroethane=60/40 by weight, the intrinsic viscosity of the sample for testing was measured by an Ostwald viscometer at 30° C. The unit of intrinsic viscosity is dl/g.

[Heat Shrinkage (Hot-Water Heat Shrinkage)]

Film was cut into a square of 10 cm×10 cm and then immersed in hot water of a predetermined temperature ±0.5° C. in no load state for 10 seconds to be heat-shrunk, followed by immersing the film in hot water of 25° C.±0.5° C. for 10 seconds. Then, the film was taken from the water, and the dimensions of the film were measured both in the lengthwise and in the transverse directions. The heat shrinkage of each direction was calculated from the following formula 1. A direction having a larger heat shrinkage was defined as a main shrinkage direction.

heat shrinkage=((length before shrinkage−length after shrinkage)/length before shrinkage)×100 (%)  Formula 1:

[Stress at 10% Elongation (F10)]

Inside the furnace of a thermostatic chamber (TCH-220, Shimadzu Corporation) was heated to 90° C. After the temperature was stabilized, sample film of the size 200 mm length in a film measurement direction and 20 mm in width was cut out. Thus obtained film was set in the chamber at a distance between chucks of 100 mm so that the film would not loosen. After the film was heated for 20 seconds, the film was drawn in accordance with JIS-K7127 using an autograph (Model; AG-1) in the thermostatic chamber. The stress at the time of 10% elongation was defined as a stress (F10) at 10% elongation at 90° C.

[Shrinkage Stress]

Film sample of 200 mm length in the main shrinkage direction and 20 mm width was cut out of a heat-shrinkable film, and a shrinkage stress was measured with a strength and elongation measuring machine having a heating furnace (TENSILON, a registered trademark of ORIENTEC CORPORATION) manufactured by Toyo Baldwin Co. Ltd. known for the current company name of ORIENTEC CORPORATION. The heating furnace was preheated to 90° C., and a distance between chucks was set to 100 mm. The air blast blown into the heating furnace was stopped to open the door of the heating furnace, then the sample was fitted to the chucks, and the door of the heating furnace was closed promptly and air blast was resumed.

A shrinkage stress was measured for 30 seconds or more per sample, and the maximum value during the measurement was taken as the maximum value of shrinkage stress (MPa).

[Shrinkage Stress of Film with 10% Slack]

A film sample of 200 mm length in the main shrinkage direction and 20 mm width was cut out of a heat-shrinkable film, and a shrinkage stress was measured with a strength and elongation measuring machine having a heating furnace (TENSILON, a registered trademark of ORIENTEC CORPORATION) manufactured by Toyo Baldwin Co. Ltd. known for the current company name of ORIENTEC CORPORATION. The heating furnace was preheated to 90° C., and the distance between chucks was set to 100 mm. The length of the film sample film between the chucks was set to 111.1 mm, and by setting the length of the film sample longer than the distance between the chucks by 11.1 mm, it became possible to measure a shrinkage stress of the film sample having 10% of slack. The air blast blown into the heating furnace was stopped to open the door of the heating furnace, then the film sample was fitted to the chucks, and the door of the heating furnace was closed promptly and the air blast was resumed.

A shrinkage stress was measured for 30 seconds or more per film sample, and the maximum value during the measurement was taken as the maximum value of shrinkage stress (MPa).

[Change Rate of Film in Width Direction]

A film sample of 260 mm length in the main shrinkage (MD) direction and 150 mm in a width direction which is orthogonal to the main shrinkage direction was cut out of a heat-shrinkable film. Then, the film sample was fitted to a frame having a length and a width of 200 mm each so that the film sample was in a tense state having no slack. The film sample was fitted to the center of the frame so that there existed gaps of 25 mm from each side of the frame in a non-shrinkage direction of the film sample.

The frame fitted with the film sample was placed in a hot-air oven (PHH-102, ESPEC CORP.) heated to 90° C. from a small window of the oven, and the frame was removed from the oven after heated for ten seconds. Then, the width of the film sample fitted to the frame was measured at the point where the film sample had the shortest width in the width direction of the film. The change rate in the width direction was calculated from the formula 2.

change rate of film in width direction=((width before shrinkage−width after shrinkage)/width before shrinkage)×100(%)  Formula 2:

[Change Rate of Film in Width Direction with 10% Slack]

A film sample of 290 mm length in the main shrinkage (MD) direction and 150 mm in the width direction which is orthogonal to the main shrinkage direction was cut out of a heat-shrinkable film. Then, the film sample was fitted to a frame with a length and a width of 200 mm each. The fitting of the film sample was adjusted so that the length of the film sample in the longitudinal direction within both sides of the frame became 222 mm including 22 mm of slack and the position of the film sample in the non-shrinkage direction became the center of the frame to provide gaps of 25 mm from each side of the frame.

A frame fitted with the film sample was placed in a hot-air oven (PHH-102, ESPEC CORP.) heated to 90° C. from a small window of the oven, and then the frame was removed from the oven after heated for ten seconds. The film sample fitted to the frame heat shrank in the longitudinal direction and had no slack. Then, the width of the film sample fitted to the frame was measured at the point where the film sample had the shortest width in the width direction of the film. The change rate in the width direction was calculated from the formula 2.

Shrinkage Finishing Property

To a plastic noodle container, which has long side 220 mm×short side 150 mm×height 50 mm, commercially available at a convenience store, two pieces of film of 100 mm width were placed above and below the container so that the film can close the body and the lid part of the container. The film was heat-sealed at 130° C. at the edges of the film together forming an adhesion point, that is, at this time, the noodle container is covered with a heat-sealed, annular-shaped film. Then the film was set so that the shrinkage (MD) direction of film became a circumferential direction of the annular-shaped film and the long sides of the noodle container is closed with the annular-shaped film. In addition, the film was set so that the midpoint of the film in the width direction and the midpoint of the container in the long side were aligned.

The amount of slack in the annular-shaped film to the container was set to 10%. With a hot-air type shrink machine (TORNAD 2500, Nippon Technology Solution Co., Ltd.), this noodle container and annular-shaped film was heat-shrunk with hot air of a set temperature of 100° C., then the evaluation of shrinkage fitting property was made. The residence time in the furnace was 8 seconds. For shrinkage finishing property after heat-shrinkage in the furnace, evaluation was made on three points, a change rate of label width, deformation of container, and a rip in the heat-sealed part of film.

Change Rate of Label Width

Change rate of label width was decided according to the above formula 2 and was evaluated in accordance with the criteria as follows.

Good: 0%≤change rate≤20%
Fair: 20%<change rate≤25%
Poor: 25%<change rate

Deformation of Container

Deformation of a container was defined as a deformation amount R obtained by a change in distance A before and after shrinkage according to the following formula 3. A is the distance from the midpoint of one long side of a container to the midpoint of the other longer side of a container. A container having a large value of the deformation amount was evaluated to be a container having a large deformation, and the criteria was as follows.

$$\text{Deformation amount } R = A(\text{before shrinkage}) - A'(\text{after shrinkage}) \quad \text{Formula 3:}$$

Good: 0 mm≤R<3 mm
Fair: 3 mm≤R<5 mm
Poor: 5 mm≤R

Rip in Heat-Sealed Part

The film after heat shrinking was visually checked for a rip in the heat-sealed part in accordance with the following criteria.

Good: without rip
Poor: with rip, irrespective of size

Preparation of Polyester Raw Material

Synthetic Example 1

To a stainless steel autoclave equipped with a stirrer, a thermometer and a partially circulating cooler, 100 mol % of dimethyl terephthalate (DMT) as a dicarboxylic acid constituent, 100 mol % of ethylene glycol (EG) as a polyhydric alcohol constituent were added so that the amount of ethylene glycol became 2.2 times that of dimethyl terephthalate in a molar ratio. An ester exchange reaction was carried out with addition of 0.05 mol % of zinc acetate (based on the acid component) as an ester exchange catalyst and 0.225 mol % of antimony trioxide (based on the acid component) as polycondensation catalyst while distilling away the generated methanol from the system. Thereafter, a polycondensation reaction was carried out at 280° C. under a reduced pressure of 26.7 Pa to obtain polyester 1 having an intrinsic viscosity of 0.69 dl/g. The composition of polyester 1 is shown in Table 1.

Synthetic Examples 2 to 4

Polyesters 2 to 4 shown in Table 1 were obtained in the same manner as in Synthetic Example 1. In the production of polyester 2, $SiO_2$ (Silysia 266, FUJI SILYSIA CHEMICAL LTD.) having an average particle diameter of 1.5 μm was added as a lubricant to polyester at a rate of 10000 ppm. In Table 1, TPA represents terephthalic acid, EG represents ethylene glycol, NPG represents neopentyl glycol and BD represents 1,4-butanediol. The intrinsic viscosities of each polyester was 0.69 dl/g. The polyesters were appropriately formed into chips. The composition of each polyester is shown in Table 1.

Synthetic Example 5

Polyester 5 shown in Table 1 was obtained. In the production of polyester 5, 500 ppm of precipitated uniform and fine particles having a particle diameter of 0.5 to 1 μm and including calcium, lithium and phosphorus elements were contained. The intrinsic viscosity of polyester 5 was 0.67 dl/g, and Tg was 63° C. The polyester was appropriately formed into chip. The composition of each polyester is shown in Table 1.

TABLE 1

| | composition of polyester raw material (mol %) | | | | | | amount of lubricant (ppm) |
|---|---|---|---|---|---|---|---|
| | dicarboxylic acid components | | glycol components | | | | |
| | TPA | IPA | EG | NPG | BD | DEG | |
| Polyester 1 | 100 | 0 | 100 | 0 | 0 | 0 | 0 |
| Polyester 2 | 100 | 0 | 100 | 0 | 0 | 0 | 100000 |
| Polyester 3 | 100 | 0 | 70 | 30 | 0 | 0 | 0 |
| Polyester 4 | 100 | 0 | 0 | 0 | 100 | 0 | 0 |
| Polyester 5 | 80 | 20 | 85 | 0 | 0 | 15 | 500 |

TPA: Terephthalic acid
IPA: Isophthalic acid
EG: Ethylene glycol
NPG: Neopentyl glycol
BD: Butanediol
DEG: Diethylene glycol

Example 1

Polyester 1, polyester 2, polyester 3, and polyester 4 described above were mixed in the mass ratio of 20:5:57:18, and the mixed resin was introduced into an extruder. Then, the mixed resin was molten at 270° C. and extruded from a T-die, and quenched by winding around a rotating metal roll cooled to a surface temperature of 25° C. at a speed of 20 m/min to obtain an undrawn film of 48 μm thickness. Tg of the undrawn film was 69° C. The obtained undrawn film was introduced to a lengthwise drawing machine in which a plurality of rolls were continuously arranged, heated on a preheating roll till the film temperature reached 85° C. (Tg+16° C.). Then, the film was longitudinally drawn by the roll drawing method to obtain a drawing ratio of 4.4 times in the longitudinal direction and a thickness of 11 μm after drawing. Once the film was longitudinally drawn, the film was heated with a heat treatment roll set at a surface temperature of 90° C. (Tg+21° C.), and then the film was 10% relaxed using the speed difference between the rolls while being applied hot air of 110° C. at a place where the gap between the rolls was 1000 mm. After cutting and removing both edges of the film, the film was wound into a roll of 12 μm thickness and 900 mm width. The characteristics of the obtained film were evaluated by the above-mentioned methods. The manufacturing conditions are shown in Table 2, and the evaluation results are shown in Table 3. The labels made from the obtained film had good shrinkage finishing property.

Example 2

The film was produced in the same method as Example 1 except that the drawn ratio in the longitudinal direction was changed to 3.3 times and the production condition was adjusted so that the thickness of the film was 16 μm. The manufacturing conditions are shown in Table 2, and the evaluation results are shown in Table 3. The labels made from the obtained film had good shrinkage finishing property.

Example 3

The mass ratio of polyester 1, polyester 2, polyester 3, and polyester 4 was changed to 5:5:65:25 from that of Example 2. Tg of the obtained undrawn film was 65° C. The film was produced in the same method as Example 2 except that the temperature of the preheating roll was changed from 85° C. to 81° C. (Tg+16° C.) and the temperature of the heat treatment roll was changed from 90° C. to 86° C. (Tg+21° C.). The obtained film was 16 μm thickness. The characteristics of the obtained film were evaluated by the above-mentioned methods. The manufacturing conditions are shown in Table 2, and the evaluation results are shown in Table 3. The labels made from the obtained film had good shrinkage finishing property.

Example 4

The mass ratio of polyester 1, polyester 2, polyester 3, and polyester 4 was changed to 28:5:57:10 from that of Example 1. Tg of the obtained undrawn film was 71° C. The film was produced in the same method as Example 1 except that the temperature of the preheating roll was changed from 85° C. to 87° C. (Tg+16° C.), the temperature of the heat treatment roll was changed from 90° C. to 92° C. (Tg+21° C.), the drawn ratio in the longitudinal direction was changed from 4.4 times to 4.2 times, and the relaxation rate was changed from 10% to 5%. The obtained film was 12 μm thickness. The characteristics of the obtained film were evaluated by the above-mentioned methods. The manufacturing conditions are shown in Table 2, and the evaluation results are shown in Table 3. The labels made from the obtained film had good shrinkage finishing property.

Example 5

The condition of longitudinal drawing was changed to two-step drawing from that of Example 1. In the longitudinal drawing process, the film was drawn 1.5 times at the temperature of the preheating roll of 85° C. at the first stage, and the film was drawn 2.2 times at the temperature of the preheating roll of 95° C. (Tg+24° C.) at the second stage. The total drawn ratio in the longitudinal direction was 3.3 times.

After the film was drawn 3.3 times in the longitudinal direction and heated with the heat treatment roll set at a surface temperature of 90° C. (Tg+21° C.), the film was applied hot air of 90° C. at a place where the gaps between the rolls was 1000 mm, and the film of 30 μm thickness was obtained. The characteristics of the film were evaluated by the above-mentioned methods. The manufacturing conditions are shown in Table 2, and the evaluation results are shown in Table 3. The labels made from the obtained film had good shrinkage finishing property.

Comparative Example 1

Polyester 1, polyester 2, polyester 3, and polyester 4 described above were mixed in the mass ratio of 40:5:45:10, and the mixed resin was introduced into an extruder. The mixed resin was molten at 270° C. and extruded from a T-die, and quenched by winding around a rotating metal roll set at a surface temperature of 25° C. at a speed of 20 m/min to obtain an undrawn film of 50 μm thickness was obtained. Tg of the undrawn film was 71° C. The obtained undrawn film was introduced to a lengthwise drawing machine in which a plurality of rolls was continuously arranged, heated on a preheating roll till the film temperature reached 87° C. (Tg+16° C.). Then, the film was longitudinally drawn by the roll drawing method to obtain a drawing ratio of 4.4 times in the longitudinal direction and a thickness of 11 μm after drawing. After the lengthwise drawing, the film was heated with a heat treatment roll set at a surface temperature of 92° C. (Tg+21° C.), and then the film was 5% relaxed using the speed difference between the rolls while being applied hot air of 110° C. at a place where the gaps between the rolls was 1000 mm. After cutting and removing both edges of the film, the film was wound into a roll of 12 μm thickness and 900 mm width. The characteristics of the obtained film were evaluated by the above-mentioned methods. The manufacturing conditions are shown in Table 2, and the evaluation results are shown in Table 3. The labels made from the obtained film was inferior in shrinkage finishing property.

Comparative Example 2

The same producing method as Comparison Example 1 was taken except that the film thickness was changed to 55 μm from 50 μm and drawing ratio in the longitudinal direction was changed to 4.8 times from 4.4 times. The characteristics of the film were evaluated by the above-mentioned methods. The manufacturing conditions are shown in Table 2, and the evaluation results are shown in Table 3. The labels made from the obtained film was inferior in shrinkage finishing property.

Comparative Example 3

Film was made with the same composition of raw materials as that of Example 4. The production method was the same as Example 4 except that the thickness of an undrawn film was changed to 58 μm, drawing ratio in the longitudinal direction was changed to 4.8 times, and no heat nor relaxation treatment in the longitudinal direction was performed. The characteristics of the film were evaluated by the above-mentioned methods. The manufacturing conditions are shown in Table 2, and the evaluation results are shown in Table 3. The labels made from the obtained film was inferior in shrinkage finishing property.

Comparative Example 4

Film of 60 μm thickness was obtained by using polyester raw material 5, drawing the film 3.5 times in the longitudinal direction, and contacting the film with a heating roll of 80° C. for 0.5 seconds. The manufacturing conditions are shown in Table 2, and the evaluation results are shown in Table 3. The labels made from the obtained film was inferior in shrinkage finishing property. The film was too thick, and an increased shrinkage force and a container's deformation were caused.

Comparative Example 5

Polyester 1, polyester 2, polyester 3, and polyester 4 were mixed in the mass ratio of 25:5:60:10 to prepare mixed resin for a skin layer. Also, polyester 1, polyester 2, polyester 3, and polyester 4 described above was mixed in the mass ratio of 25:5:30:40 to prepare mixed resin for a core layer. Above-described mixed resin for each layer, a skin layer and a core layer, was co-extruded from a T-die having a two-layer multi-manifold and using two twin-screw extruders at 280° C. And then the extruded resin was promptly cooled with a cooling roll. An undrawn film having two layers composed of both the skin layer and the core layer, and 48 μm thickness was obtained. Tg of the undrawn film was 62° C. The mixed resin was co-extruded so that the thickness ratio of the skin layer and the core layer became 1:4. Then the undrawn film was introduced to a lengthwise drawing machine in which a plurality of rolls was continuously arranged, heated on a preheating roll till the temperature of the film reached 95° C. Then the film was longitudinally drawn by a roll drawing method to obtain a drawing ration of 4.0 times. After being drawn in the longitudinal direction, the film was cooled with a cooling roll set to a surface temperature of 25° C. and wound up in a roll. The obtained film was composed of two different layers and 12 μm thickness. The evaluation results are shown in Table 3. The labels made from the obtained film was inferior in shrinkage finishing property.

Comparative Example 6

Polyester 1, polyester 2, polyester 3, and polyester 4 were mixed in the mass ratio of 25:5:60:10, and the mixed resin was introduced into an extruder. Then, the mixed resin was molten at 280° C. and extruded from a T-die, quenched by winding around a rotating metal roll cooled to a surface temperature of 30° C., and an undrawn film of 42 μm thickness was obtained. Tg of the undrawn film was 75° C. The obtained undrawn film was introduced to a lengthwise drawing machine in which a plurality of rolls were continuously arranged, and the film was heated on a preheating roll till the temperature reached 80° C. The film was then longitudinally drawn by two-step drawing of a roll drawing method. The drawing ratio was 1.5 times at the first stage and 3.0 times at the second stage, and the drawing distance was 160 mm at the first stage and 31 mm at the second stage. Then, the film was cooled with a cooling roll set to a surface temperature of 25° C. and wound up in a roll, and extruded from a T-die. The film was quenched by winding around a rotating metal roll cooled to a surface temperature of 30° C., and an undrawn film of 42 μm thickness was obtained. Tg of the undrawn film was 75° C. The undrawn film was introduced to a lengthwise drawing machine in which a plurality of rolls was continuously arranged, heated on a preheating roll till the film temperature reached 80° C. Then the film was longitudinally drawn by one-step drawing of a roll drawing method to obtain a drawing ratio of 3.5 times in the longitudinal direction and thickness of 12 μm. The film was drawn by 31 mm at this time. After longitudinally drawn, the film was cooled with a cooling roll set to a surface temperature of 25° C. and wound up in a roll, and the undrawn film of 12 μm thickness was obtained. The evaluation results are shown in Table 3. The labels made from the obtained film was inferior in shrinkage finishing property.

TABLE 2

| | layer composition | raw material polyester mixture ratio | | | | | amorphous component (mol %) | BD ratio (mol %) |
|---|---|---|---|---|---|---|---|---|
| | | 1 | 2 | 3 | 4 | 5 | | |
| Example 1 | single layer | 20 | 5 | 57 | 18 | — | 17.1 | 18 |
| Example 2 | single layer | 20 | 5 | 57 | 18 | — | 17.1 | 18 |
| Example 3 | single layer | 5 | 5 | 65 | 25 | — | 19.5 | 25 |
| Example 4 | single layer | 28 | 5 | 57 | 10 | — | 17.1 | 10 |
| Example 5 | single layer | 20 | 5 | 57 | 18 | — | 17.1 | 18 |
| Comparative Example 1 | single layer | 40 | 5 | 45 | 10 | — | 13.5 | 10 |
| Comparative Example 2 | single layer | 40 | 5 | 45 | 10 | — | 13.5 | 10 |
| Comparative Example 3 | single layer | 28 | 5 | 57 | 10 | — | 17.1 | 10 |
| Comparative Example 4 | single layer | — | — | — | — | 100 | 15.0 | — |
| Comparative Example 5 | skin layer | 25 | 5 | 60 | 10 | — | 18.0 | 10 |
| | core layer | 25 | 5 | 30 | 40 | — | 9.0 | 40 |
| Comparative Example 6 | single layer | 25 | 5 | 60 | 10 | — | 18.0 | 10 |

| | drawing in MD direction | | | | relaxation in longitudinal direction | | |
|---|---|---|---|---|---|---|---|
| | first stage | | second stage | | | | |
| | temperature of preheating roll (° C.) | drawing ratio | temperature of preheating roll (° C.) | drawing ratio | total drawing ratio | temperature of heat treating roll (° C.) | temperature of hot air (° C.) | relaxation rate in longitudinal direction |
| Example 1 | 85 | 4.4 | — | — | 4.4 | 90 | 110 | 10 |
| Example 2 | 85 | 3.3 | — | — | 3.3 | 90 | 110 | 10 |
| Example 3 | 81 | 3.3 | — | — | 3.3 | 86 | 110 | 10 |
| Example 4 | 87 | 4.2 | — | — | 4.2 | 92 | 110 | 5 |
| Example 5 | 85 | 1.5 | 95 | 2.2 | 3.3 | 90 | 110 | 0 |
| Comparative Example 1 | 87 | 4.4 | — | — | 4.4 | 92 | 110 | 5 |
| Comparative Example 2 | 87 | 4.8 | — | — | 4.8 | 92 | 110 | 5 |
| Comparative Example 3 | 87 | 4.8 | — | — | 4.8 | 30 | 30 | 0 |
| Comparative Example 4 | 73 | 3.5 | — | — | 3.5 | 80 | — | — |
| Comparative Example 5 | 95 | 4.0 | — | — | 4.0 | 25 | — | — |
| Comparative Example 6 | 80 | 1.5 | — | 3.0 | 4.5 | 25 | — | — |

TABLE 3

| | thickness (μm) | shrinkage in hot water of 80° C. (%) | | shrinkage stress (MPa) | | change rate in width direction (%) | | F10 at 90° C. (MPa) | | evaluation of shrinkage finishing | | |
|---|---|---|---|---|---|---|---|---|---|---|---|---|
| | | longitudinal direction | width direction | w/o slack | 10% slack | w/o slack | 10% slack | MD direction | width direction | change rate of label width | deformation of container | rip in heat-sealed part |
| Example 1 | 12 | 53 | −2 | 7 | 5.2 | 15 | 12 | 3.3 | 1.8 | Good | Good | Good |
| Example 2 | 16 | 46 | −2 | 4.9 | 3.6 | 13 | 10 | 2.5 | 1.5 | Good | Good | Good |
| Example 3 | 16 | 55 | −5 | 3 | 2.1 | 9 | 6 | 1.5 | 1.1 | Good | Good | Good |
| Example 4 | 12 | 45 | 2 | 9 | 5.8 | 20 | 18 | 4.5 | 2.1 | Good | Good | Good |
| Example 5 | 30 | 58 | 5 | 5.4 | 3.7 | 17 | 14 | 2 | 1.4 | Good | Good | Good |
| Comparative Example 1 | 12 | 45 | 4 | 11 | 6.4 | 28 | 25 | 5.5 | 1.2 | Fair | Fair | Good |
| Comparative Example 2 | 12 | 46 | 5 | 13 | 8 | 34 | 31 | 6 | 1.3 | Poor | Poor | Good |
| Comparative Example 3 | 12 | 46 | 3 | 9.5 | 6 | 25 | 22 | 4.8 | 0.3 | Poor | Good | Good |

TABLE 3-continued

| | thick-ness (μm) | shrinkage in hot water of 80° C. (%) | | shrinkage stress (MPa) | | change rate in width direction (%) | | F10 at 90° C. (MPa) | | evaluation of shrinkage finishing | | |
|---|---|---|---|---|---|---|---|---|---|---|---|---|
| | | longitudinal direction | width direction | w/o slack | 10% slack | w/o slack | 10% slack | MD direction | width direction | change rate of label width | defor-mation of container | rip in heat-sealed part |
| Comparative Example 4 | 60 | 51 | 0 | 8.8 | 5.7 | 19 | 21 | 4.3 | 0.3 | Poor | Poor | Poor |
| Comparative Example 5 | 12 | 53 | 1 | 8 | 6.3 | 18 | 21 | 3.2 | 0.4 | Poor | Good | Good |
| Comparative Example 6 | 12 | 53 | 0.5 | 10.5 | 6 | 22 | 20 | 5.3 | 1 | Poor | Good | Good |

As the evaluation result show, the polyester films of examples 1 to 5 had sufficient shrinkage finishing property, and no deformation of a label and a container and no peeling off of heat-sealing was observed at the time of shrink finishing. The films were highly qualified in the use as a band label, and excellent in practical use.

On the other hand, the polyester films of comparative examples 1, 2, and 6 had a high shrinkage stress and a high change rate in width direction, so the films were inferior in label width change and the container deformation as a result. The films of comparative examples 3, 4, and 5 had low F10 at 90° C. in the width direction of the film and large width change rate after 10% shrinkage, so the films were inferior in the label width change as a result.

INDUSTRIAL APPLICABILITY

The heat-shrinkable polyester film with excellent heat-sealability of the present invention has excellent properties as described above, therefore the film can be suitably used as a band label for a box lunch container and a noodle container.

The invention claimed is:

1. A uniaxial drawn heat-shrinkable polyester film having a main shrinkage direction in a longitudinal direction of the film, wherein
   the film is a single layer which comprises 40 mol % or more of ethylene glycol in 100 mol % of polyhydric alcohol constituents and 8 mol % or more and 40 mol % or less of 1,4-butanediol in 100 mol % of polyhydric alcohol constituents,
   the film has a shrinkage of 35% or more and 70% or less in the longitudinal direction after 10 seconds immersion in hot water of 80° C.,
   the film has a shrinkage of −8% or more and 7% or less in a width direction orthogonal to the longitudinal direction after 10 seconds immersion in hot water of 80° C.,
   the film has a change rate of 5% or more and 22% or less in the width direction of the film, and the change rate is measured by fixing the film in the longitudinal direction with fixed-length in the longitudinal direction and gripping the film in hot air of 90° C. for 10 seconds,
   the film has a change rate of 5% or more and 20% or less in the width direction of the film, and the change rate is measured by fixing the film in the longitudinal direction with 10% of slack in the longitudinal direction and gripping the film in hot air of 90° C. for 10 seconds,
   the film has a maximum shrinkage stress of 2 MPa or more and 10 MPa or less in the longitudinal direction measured under hot air of 90° C., and
   the film has a stress at 10% elongation of 1 MPa or more and 5 MPa or less in the longitudinal direction and 0.5 MPa or more and 3 MPa or less in the width direction when measured under hot air of 90° C.

2. The heat-shrinkable polyester film according to claim 1, wherein the film has a thickness of 6 μm or more and 30 μm or less.

3. The heat-shrinkable polyester film according to claim 1, wherein the film has butanediol constituent of 8 mol % or more and 40 mol % or less in a whole glycol constituent of the polyester constituting the film.

4. The heat-shrinkable polyester film according to claim 1, wherein the film has a maximum heat shrinkage stress of 1 MPa or more and 6 MPa or less, and the maximum shrinkage stress is measured by fixing the film with 10% of slack in the longitudinal direction under hot air of 90° C.

5. The heat-shrinkable polyester film according to claim 1, wherein the film is used as a band label for a plastic container for packaging.

6. A container covered with a band label, wherein the band label is formed by heat-sealing the heat-shrinkable polyester film according to claim 5 in an annular shape.

* * * * *